United States Patent
Hasegawa

(10) Patent No.: US 11,016,326 B2
(45) Date of Patent: May 25, 2021

(54) CURVED DISPLAY PANEL AND METHOD OF PRODUCING THE SAME

(71) Applicant: SHARP KABUSHIKI KAISHA, Sakai (JP)

(72) Inventor: Hiroshi Hasegawa, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/663,913

(22) Filed: Oct. 25, 2019

(65) Prior Publication Data

US 2020/0142251 A1    May 7, 2020

Related U.S. Application Data

(60) Provisional application No. 62/755,636, filed on Nov. 5, 2018.

(51) Int. Cl.
*G02F 1/1335*    (2006.01)
*G02F 1/1343*    (2006.01)

(52) U.S. Cl.
CPC .. *G02F 1/133512* (2013.01); *G02F 1/133514* (2013.01); *G02F 1/134336* (2013.01); *G02F 2201/52* (2013.01); *G02F 2201/56* (2013.01)

(58) Field of Classification Search
CPC ......... G02F 1/133512; G02F 1/133514; G02F 2201/52; G02F 2201/56; G02F 1/133305
See application file for complete search history.

(56) References Cited

U.S. PATENT DOCUMENTS

| | | | | |
|---|---|---|---|---|
| 2008/0137013 A1* | 6/2008 | Kamoshida | ....... | G02F 1/133305 349/106 |
| 2015/0055042 A1* | 2/2015 | Chung | .............. | G02F 1/134309 349/42 |
| 2015/0370121 A1* | 12/2015 | Wu | .................... | G02F 1/133512 349/106 |
| 2016/0116774 A1* | 4/2016 | Ma | .................... | G02F 1/133514 156/250 |
| 2016/0274420 A1* | 9/2016 | Oh | .................... | G02F 1/136209 |
| 2017/0108743 A1* | 4/2017 | Chu | .................... | G02F 1/134309 |
| 2017/0227805 A1* | 8/2017 | Chong | .............. | G02F 1/134309 |
| 2018/0031906 A1* | 2/2018 | Park | .................... | G02F 1/133514 |

(Continued)

FOREIGN PATENT DOCUMENTS

JP    2008-145778 A    6/2008

*Primary Examiner* — Jia X Pan
(74) *Attorney, Agent, or Firm* — ScienBiziP, P.C.

(57) ABSTRACT

A curved display panel including a display surface curved around one curving axis includes a first substrate, a second substrate disposed opposite the first substrate while having a space therebetween, first pixel sections included in the first substrate and arranged within a surface area of the display surface, and second pixel sections included in the second substrate and arranged within the surface area of the display surface and overlapping the first pixel sections, respectively, in a curved state of the display surface. For at least some of the second pixel sections that are to be displaced by curving, position relation with respect to the first pixel sections in the flat state of the display surface is changed from that in the curved state of the display surface by a correction displacement amount based on an assumed displacement amount corresponding to a position within the surface area of the display surface.

12 Claims, 12 Drawing Sheets

(56) References Cited

U.S. PATENT DOCUMENTS

2018/0136511 A1\* 5/2018 Kudo ................ G02F 1/133512
2018/0348569 A1\* 12/2018 Chen ................ G02F 1/133305
2020/0041835 A1\* 2/2020 Asamizu ........... G02F 1/133512

\* cited by examiner

CURVED DISPLAY PANEL AND METHOD OF PRODUCING THE SAME

CROSS REFERENCE TO RELATED APPLICATION

This application claims priority from U.S. Provisional Patent Application No. 62/755,636 filed on Nov. 5, 2018. The entire contents of the priority application are incorporated herein by reference.

TECHNICAL FIELD

The technology described herein relates to a curved display panel and a method of producing the curved display panel.

BACKGROUND ART

One example of a liquid crystal display device including a curved display surface that is described in Japanese Unexamined Patent Application Publication No. 2008-145778 has been known. The liquid crystal display device is configured as follows. A liquid crystal panel is entirely curved such that a CF substrate side surface, which is an observer's side, is recessed seen from an observer such that intervals of the pixels on the CF substrate in the horizontal direction are smaller than intervals of the pixels on the TFT substrate in the horizontal direction. Or the intervals are set same and a horizontal width of the black matrix that is present in left and right edge sections of the CF substrate curved in a recessed shape is configured to be greater than a horizontal width of the black matrix that is present in a middle section thereof.

In the liquid crystal display device, the horizontal width of the black matrix extends equally in the two edge sections of the CF substrate in the horizontal direction. Therefore, an aperture ratio in the two edge sections may be greatly reduced. Furthermore, the horizontal width of the black matrix in the two edge sections differs from that in the middle section of the CF substrate with respect to the horizontal direction and therefore, the aperture ratio is also different in each of the sections. Therefore, brightness/darkness unevenness may be caused in the two edge sections and the middle section with respect to the horizontal direction.

SUMMARY

The technology described herein was made in view of the above circumstances and an object is to restrict lowering of an aperture ratio and occurrence of brightness unevenness.

A curved display panel including a display surface displaying an image and curved around at least one curving axis according to the technology described herein includes a first substrate, a second substrate disposed opposite the first substrate while having a space therebetween, first pixel sections included in the first substrate and arranged within a surface area of the display surface, and second pixel sections included in the second substrate and arranged within the surface area of the display surface and overlapping the first pixel sections, respectively, in a curved state of the display surface. Some of the second pixel sections are to be displaced with respect to the first pixel sections according to change of the display surface from a flat state to the curved state, and for at least the some of the second pixel sections that are to be displaced by curving, position relation with respect to the first pixel sections in the flat state of the display surface is changed from that in the curved state of the display surface by a correction displacement amount based on an assumed displacement amount corresponding to a position within the surface area of the display surface.

A method of producing a curved display panel according to the technology described herein includes a flat display panel producing process of producing a flat display panel having a display surface that is flat, the flat display panel including a first substrate and a second substrate that is opposite the first substrate having a space therebetween, the first substrate including first pixel sections that are arranged within a surface area of the display surface displaying an image, the second including second pixel sections that are arranged within the surface area of the display surface, and a flat display panel deformation process of deforming the flat display panel such that the display surface is curved around at least one curving axis and the first pixel sections overlap the second pixel sections. In the flat display panel producing process, for at least the second pixel sections that are to be displaced with respect to the first pixel sections according to performance of the flat display panel deformation process, position relation with respect to the first pixel sections in the display surface in the a state is changed from position relation in the display surface in a curved state by a correction displacement amount based on an assumed displacement amount corresponding to a position within a surface area of the display surface.

According to the technology described herein, lowering of an aperture ratio and brightness unevenness are less likely to be caused.

DETAILED DESCRIPTION

Embodiment

Figure 1:
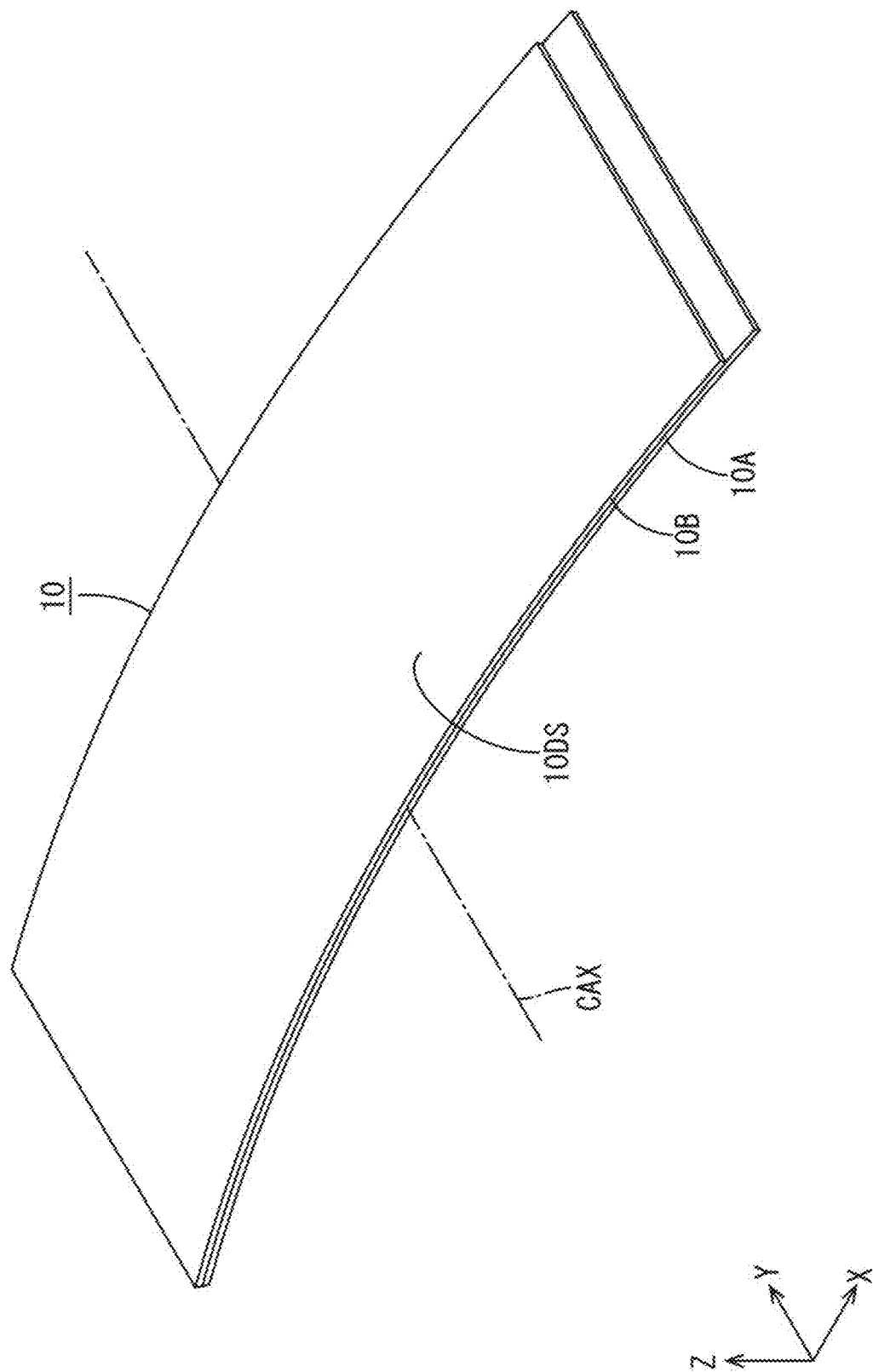
FIG. 1 is a perspective view of a curved liquid crystal panel according to one embodiment.

One embodiment will be described with reference to FIGS. 1 to 13. In this embodiment section, a curved liquid crystal panel (a curved display panel) 10 included in a liquid crystal display device and a method of producing the curved liquid crystal panel 10 will be described. X-axes, Y-axes, and Z-axes may be present in the drawings. The axes in each drawing correspond to the respective axes in other drawings. A vertical direction is defined with reference to FIGS. 2, 5 to 7, and an upper side and a lower side in the drawings correspond to a front side and a back side, respectively.

As illustrated in FIG. 1, the curved liquid crystal panel 10 includes a display surface 10DS displaying an image thereon and the display surface 10DS is curved. The curved liquid crystal panel 10 displays an image on the curved display surface 10DS while using light supplied by a backlight unit (a lighting device), which is an external light source. The curved liquid crystal panel 10 and the backlight unit configure a liquid crystal display device. The liquid crystal display device according to the present embodiment is preferably used for built-in using such as a car navigation system; however, it is not limited thereto.

As illustrated in FIG. 1, the curved liquid crystal panel 10 has a laterally elongated rectangular (quadrangular, elongated) overall shape. The curved liquid crystal panel 10 is curved in a substantially arched shape such that a middle section thereof with respect to the long-side direction projects toward the front side and two end sections with respect to the long-side direction are recessed toward the back side. The curved liquid crystal panel 10 has a substantially C-shaped cross sectional shape. In the curved liquid crystal panel 10, a short-side direction and a long-side direction thereof matches a Y-axis direction and an X-axis direction in each drawing, respectively, and a plate thickness direction thereof (a normal direction of the display surface 10DS) matches a Z-axis direction in each drawing. An axial direction (a curving perpendicular direction) of a curving axis CAX of the curved liquid crystal panel 10 matches the short-side direction (the Y-axis direction) of the curved liquid crystal panel 10. A curving direction (a direction in which curvature of the display surface 10DS changes) that is perpendicular to the curving axis CAX and along the display surface 10DS matches the long-side direction (the X-axis direction) of the curved liquid crystal panel 10. The display surface 10DS of the curved liquid crystal panel 10 is divided into a display area and a non-display area. The display area is at a middle of a screen surface and images are displayed on the display area. The non-display area is at an outer peripheral edge of the screen surface and formed in a frame shape that surrounds the display area and no image is displayed on the non-display area. The backlight unit is preferably curved along the curved liquid crystal panel 10 but may not be limited thereto.

Figure 2:
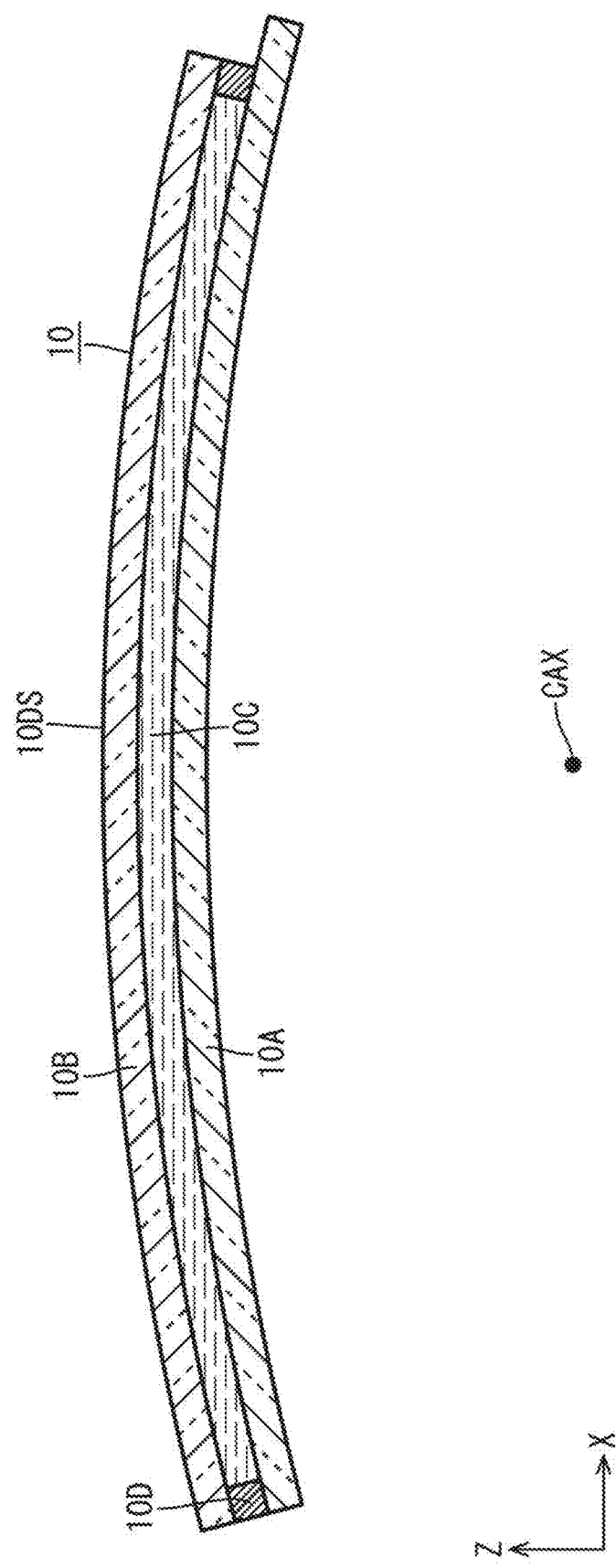
FIG. 2 is a cross-sectional view of the curved liquid crystal panel.

As illustrated in FIG. 2, the curved liquid crystal panel 10 includes an array substrate (a first substrate, an active matrix substrate) 10A, a CF substrate (a second substrate, a counter substrate) 10B that is disposed opposite and spaced from the array substrate 10A, a liquid crystal layer 10C that is present between middle portions of the substrates 10A, 10B, and a sealing member 10D that is disposed between outer peripheral edge portions of the substrates 10A, 10B. The liquid crystal layer 10C includes liquid crystal molecules whose optical characteristics are varied according to application of an electric field. The sealing member 10D surrounds the liquid crystal layer 10C to be sealed therewith. The array substrate 10A and the CF substrate 10B have a cell gap of a thickness dimension of the liquid crystal layer 10C therebetween and the cell gap is maintained by the sealing member 10D. Each of the array substrate 10A and the CF substrate 10B is made of glass that is substantially transparent and highly transmissive. Various kinds of films are stacked on opposing inner surfaces of the array substrate 10A and the CF substrate 10B. The CF substrate 10B is disposed on a front side (a front surface side) of the curved liquid crystal panel 10 and has a long side dimension that is shorter than a long side dimension of the array substrate 10A. The CF substrate 10B is bonded to the array substrate 10A such that one edges thereof with respect to the long-side direction are aligned with each other. Therefore, another edge of the array substrate 10A with respect to the long-side direction projects further toward one side than another edge of the CF substrate 10B. A flexible board that is relay-connected to a signal supply source is connected to a projected section. Polarizing plates are bonded to outer surfaces of the substrates 10A, 10B, respectively.

Figure 3:
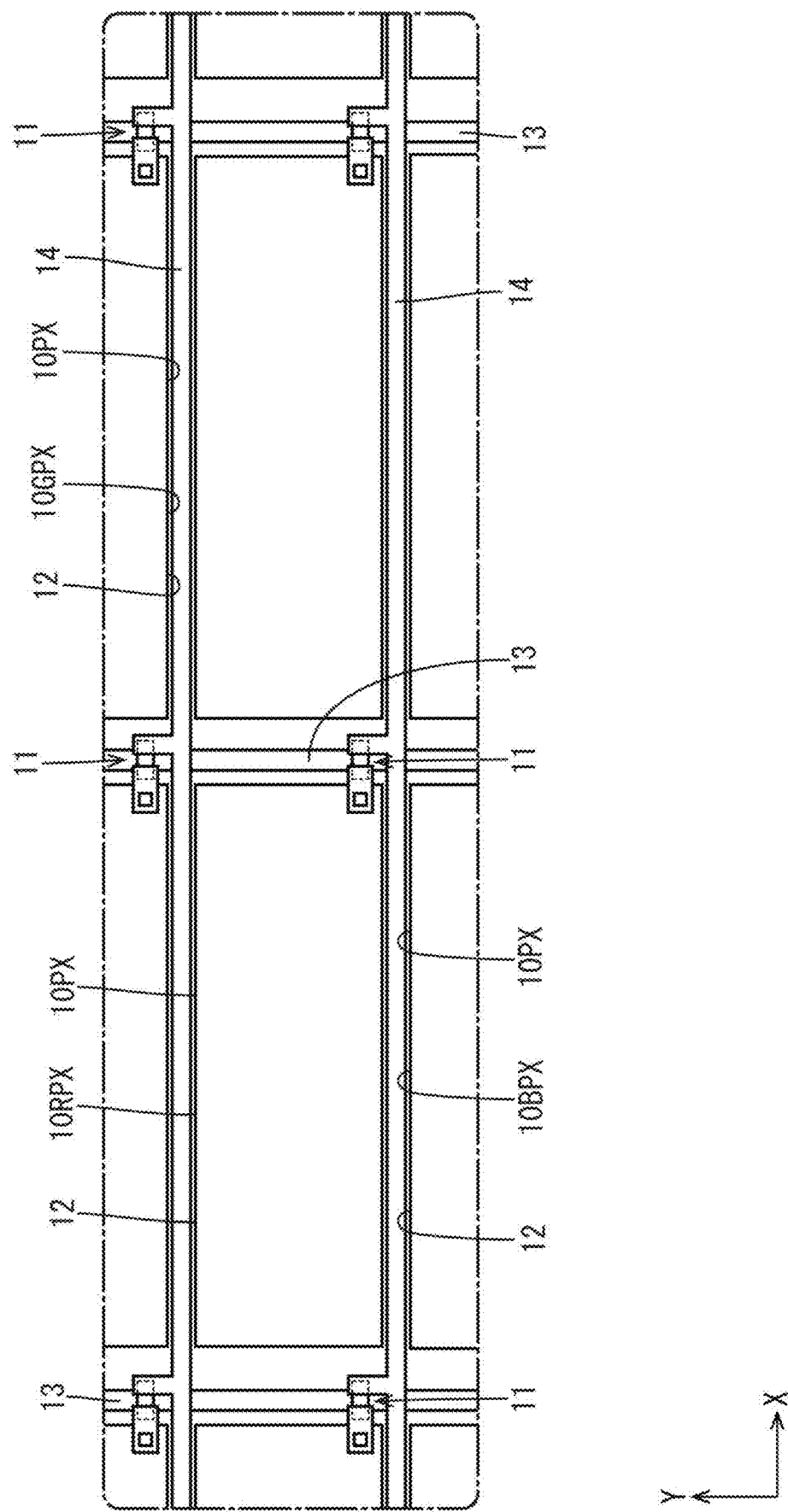
FIG. 3 is a plan view illustrating pixel arrangement on an array substrate of the curved liquid crystal panel.

As illustrated in FIG. 2, the array substrate 10A is included on a back side (a rear surface side) of the curved liquid crystal panel 10. As illustrated in FIG. 3, on an inner surface side (on a liquid crystal layer 10C side, on an opposing surface side opposite the CF substrate 10B) of the display area, which is a middle of the screen surface, of the array substrate 11A, TFTs (thin film transistors) 11, which are switching components, and pixel electrodes (a first pixel section) 12 are disposed in a matrix. The pixel electrode 12 is a part of a pixel section 10PX, which will be described later. Furthermore, gate lines (scanning lines) 13 and source lines (data lines, image lines) 14 are routed in a matrix to surround the TFTs 11 and the pixel electrodes 12 on the array substrate. In other words, the TFTs 11 and the pixel electrodes 12 are arranged in rows and columns at intersections of the gate lines 13 and the source lines 14 that are disposed in a matrix. The pixel electrode 12 has a vertically elongated square (quadrangular) plan view shape so as to be fit in an area surrounded by the gate lines 13 and the source lines 14. The pixel electrode 12 is charged with a certain potential (specifically, a potential based on a data signal supplied to the source line 14) by the TFT 11. The gate lines 13 and the source lines 14 that have light blocking properties are disposed between the adjacent pixel sections 10PX and function as a light blocking section that blocks light from travelling therethrough similar to a light blocking section 16, which will be described later. The TFT 11 has a known configuration. If the TFT 11 is driven based on a scanning signal supplied to the gate line 13, the TFT 11 charges the pixel electrode 12 with a potential according to a data signal supplied to the source line 14. The array substrate 10A may include auxiliary capacitance lines that are parallel to the gate lines 13 and cross the pixel electrodes 12.

Figure 4:
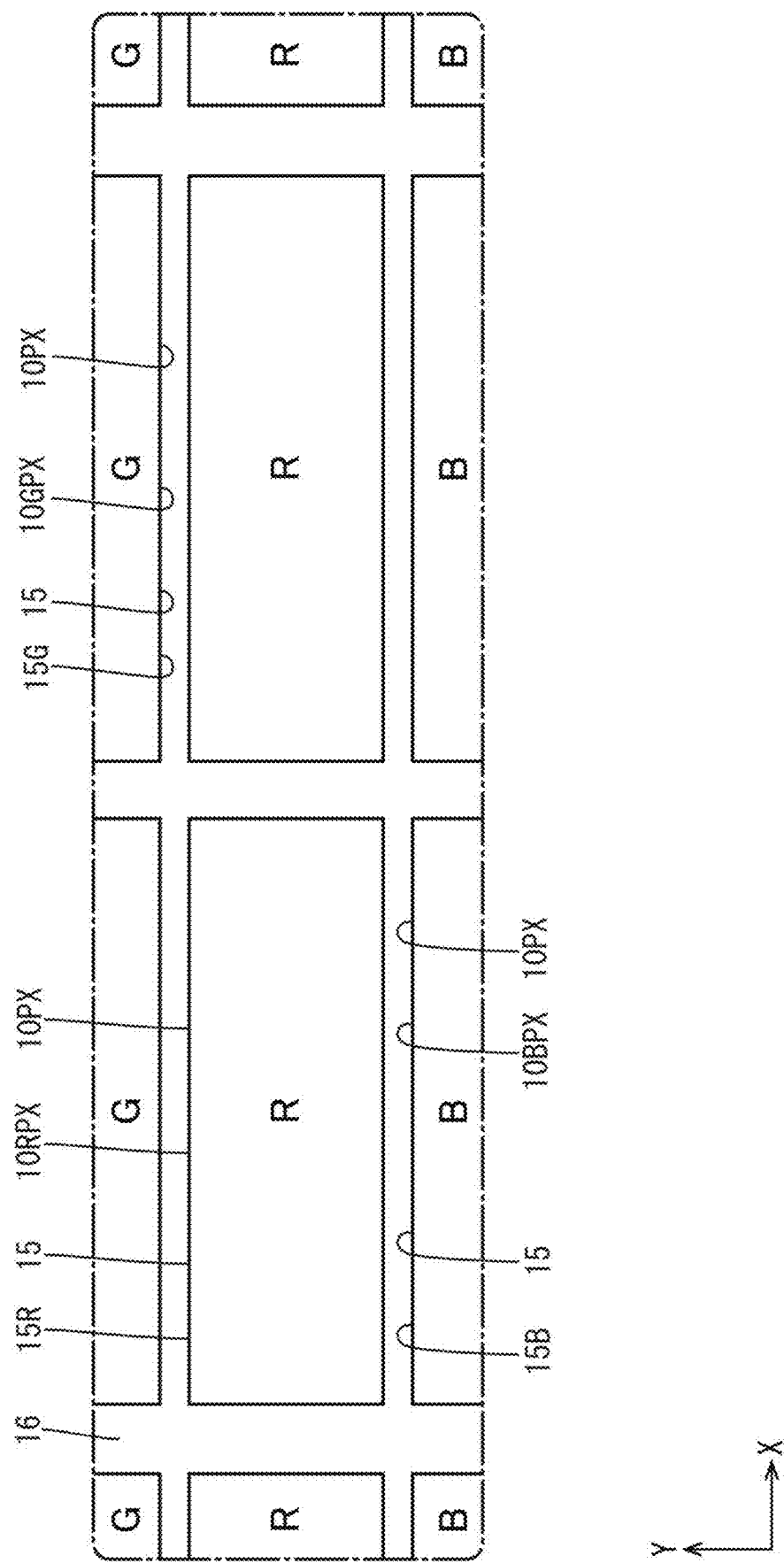
FIG. 4 is a plan view illustrating pixel arrangement on a CF substrate of the curved liquid crystal panel.

As illustrated in FIG. 4, on an inner surface side (the liquid crystal layer 10C side, on an opposing surface side opposite the array substrate 10A) of the display area of the CF substrate 10B, color filters (a second pixel section, a coloring section) 15 are arranged. The color filters 15 are arranged opposite the respective pixel electrodes 12 on the array substrate 10A. The color filter 15 is a portion of the pixel section 10PX, which will be described later, similar to the pixel electrode 12. The color filter 15 and the pixel electrode 12 that is on the array substrate 10A side and opposite the color filter 15 configure the pixel section 10PX. The color filter 15 includes pigments of a color determined by a color that is exhibited and the pigments absorb light rays of colors that are not to be exhibited such that light to be exhibited (light rays of a specific color) selectively transmit through the color filter 15. The color filters 15 that exhibit different colors are arranged in the Y-axis direction alternately in a repeated manner and those exhibiting a same color are arranged in the X-axis direction. Specifically, the color filters 15 include color filters of three colors such as a red color filter (a red second pixel section, a red coloring section) 15R exhibiting red, a green color filter (a green second pixel section, a green coloring section) 15G exhibiting green, and a blue color filter (a blue second pixel section, a blue coloring section) 15B exhibiting blue. The red color filter 15R and the opposite pixel electrode 12 configure a red pixel section 10RPX. The green color filter 15G and the opposite pixel electrode 12 configure a green pixel section 10GPX. The blue color filter 15B and the opposite pixel electrode 12 configure a blue pixel section 10BPX. In the curved liquid crystal panel 10, three pixel sections 10RPX, 10GPX, 10BPX that exhibit red, green, and blue, respectively, and are adjacent to each other in the Y-axis direction configure a display pixel that can perform color display with a certain gradation. The display pixels are arranged in the X-axis direction and the Y-axis direction within a surface plane of the display surface 10DS.

As illustrated in FIG. 4, the CF substrate 10B includes a light blocking section (a black matrix) 16 that divides the adjacent color filters 15 with respect to the X-axis direction and the Y-axis direction. The light blocking section 16 is made of light blocking material (such as carbon black) a surface of which exhibits black and is formed in substantially a grid as a whole so as to define each of the pixel sections 10PX that are adjacent to each other in the X-axis direction and the Y-axis direction. Accordingly, light is blocked from travelling between the pixel sections 10PX that are adjacent to each other in the X-axis direction and the Y-axis direction. The light blocking section 16 defines an aperture area of each color filter 15. The light blocking section 16 includes a portion that extends in the X-axis direction and the portion defines each of the pixel sections 10PX that are adjacent to each other in the Y-axis direction and exhibit different colors. Thus, color mixture is prevented between the pixel sections 10PX that exhibit different colors. The portion of the light blocking section 16 extending in the X-axis direction is overlapped with the source line 14 in a plan view. The light blocking section 16 includes a portion that extends in the Y-axis direction and the portion defines each of the pixel sections 10PX that are adjacent to each other in the X-axis direction and exhibit a same color. Thus, gradation can be ensured independently in each of the pixel sections 10PX that exhibit the same color. The portion of the light blocking section 16 extending in the Y-axis direction is overlapped with the gate line 13 in a plan view. Alignment films are disposed on most inner surfaces of the substrates 10A, 10B, respectively, to face the liquid crystal layer 10C and are configured to align the liquid crystals.

Figure 5:
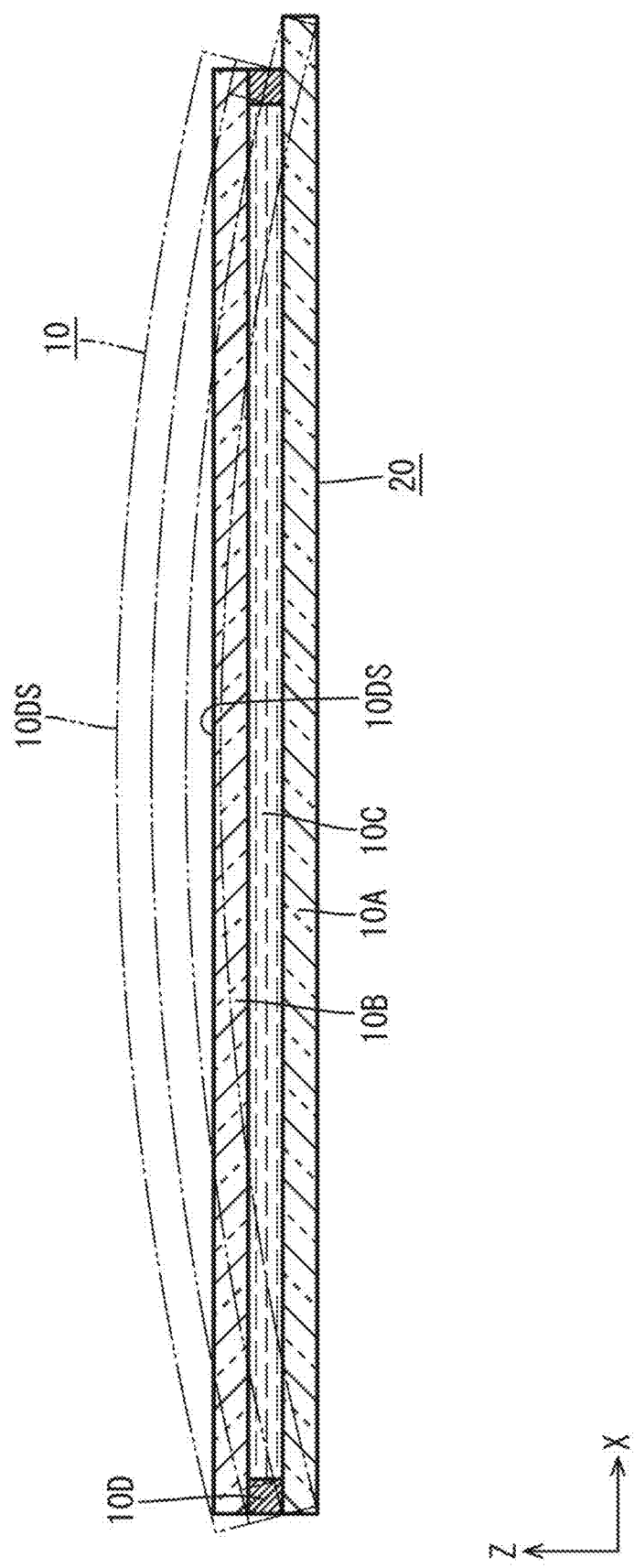
FIG. 5 is a cross-sectional view of a flat liquid crystal panel.

The curved liquid crystal panel 10 according to the present embodiment is produced as follows. A method of producing the curved liquid crystal panel 10 at least includes a flat liquid crystal panel producing process (a flat display panel producing process) of producing a flat liquid crystal panel (a flat display panel) 20 that has a flat display surface 10DS, and a flat liquid crystal panel deformation process (a flat display panel deformation process) of deforming the flat liquid crystal panel 20 such that the display surface 10DS is curved around the curving axis CAX. As illustrated in FIG. 5, a pair of substrates 10A, 10B of the flat liquid crystal panel 20 is not curved and the flat liquid crystal panel 20 is flat. In FIG. 5, an outline of the curved liquid crystal panel 10 that is obtained by deforming the flat liquid crystal panel 20 is illustrated with a chain double-dashed line. The array substrate 10A and the CF substrate 10B included in the flat liquid crystal panel 20 that is to be deformed in the flat liquid crystal panel deformation process have a space of a thickness dimension of the liquid crystal layer 10C therebetween. Therefore, in the flat liquid crystal panel deformation process, some of the color filters 15 may be displaced from original positions thereof due to the curving and may not correspond to the pixel electrode 12. This may cause leaking of light. The curved liquid crystal panel 10 is produced through the flat liquid crystal panel producing process and the flat liquid crystal panel deformation process because of the following reasons. Various kinds of films are disposed on inner surfaces of the array substrate 10A and the CF substrate 10B and the films are subjected to patterning, and in such a process, if the array substrate 10A and the CF substrate 10B do not have flat plate surfaces, objects to be formed with film patterning may be formed with low position accuracy and low dimension accuracy. Also, the curved liquid crystal panel 10 is difficult to be produced with a known producing device.

Figure 6:
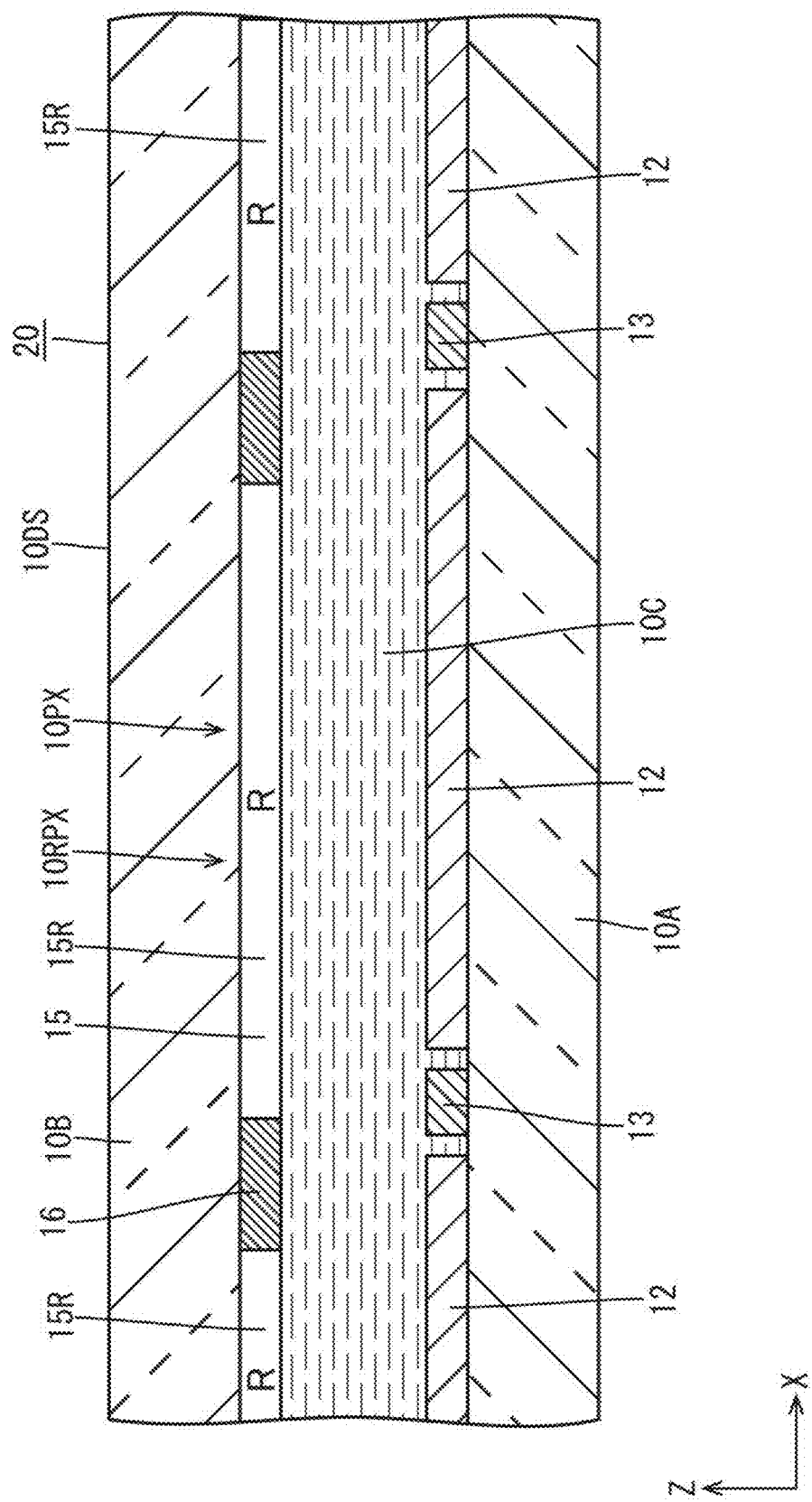
FIG. 6 is a cross-sectional view illustrating a position relation of pixel electrodes and color filters of the flat liquid crystal panel.
Figure 7:
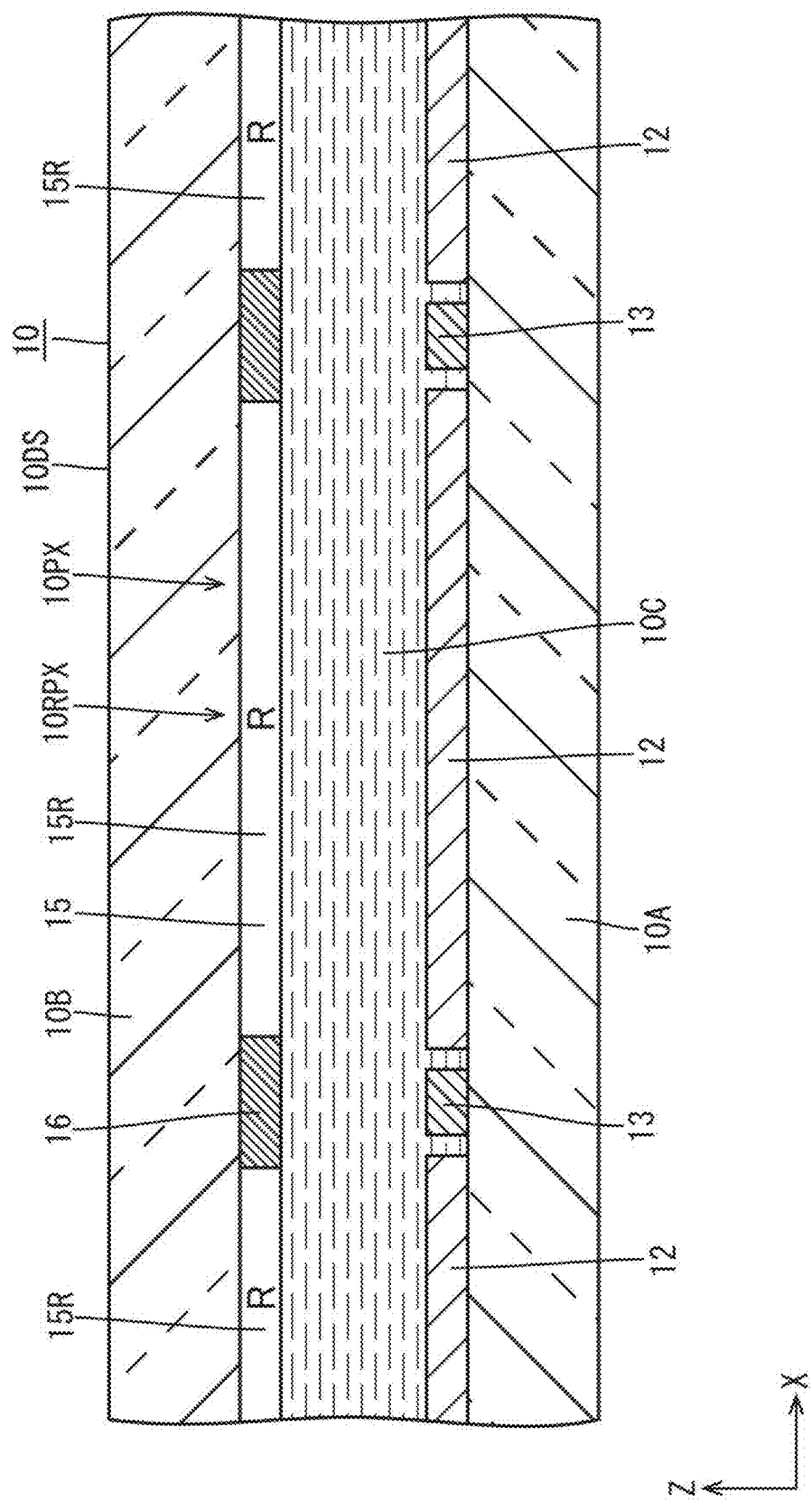
FIG. 7 is a cross-sectional view illustrating a position relation of pixel electrodes and color filters of the curved liquid crystal panel.

In the flat liquid crystal panel producing process of the present embodiment, for some of the color filters 15 that are to be moved away from the corresponding pixel electrode 12 according to performing of the flat liquid crystal panel deformation process, position relation with respect to the corresponding pixel electrodes 12 in the flat-state display surface 10DS is changed from that in the curved-state display surface 10DS by a correction displacement amount that is obtained based on an assumed displacement amount according to a position of the color filter 15 within a surface area of the display surface 10DS. Therefore, among the color filters 15 included in the flat liquid crystal panel 20, at least the color filters 15 that are displaced away from the corresponding pixel electrodes 12 according to the performance of the flat liquid crystal panel deformation process are located at positions in the flat liquid crystal panel 20 relative to the corresponding pixel electrodes 12, and the positions of the color filters 15 in the flat liquid crystal panel 20 are displaced from positions thereof in the curved liquid crystal panel 10 relative to the corresponding pixel electrodes 12 in the X-axis direction, which is the curving direction, as illustrated in FIGS. 6 and 7. The correction displacement amount of the color filter 15 by which the position of the color filter 15 is away from the corresponding pixel electrode 12 in the flat liquid crystal panel 20 with respect to the X-axis direction is determined for every position within a plane surface of the display surface 10DS based on the assumed displacement amount of the color filter 15 that is displaced with respect to the corresponding pixel electrode 12 according to the performance of the flat liquid crystal panel deformation process. The assumed displacement amount of the color filter 15 is a peculiar value that may be determined and may be different according to the position within a plane surface area of the display surface 10DS with respect to the X-axis direction and the Y-axis direction. According to such a configuration, the flat liquid crystal panel deformation process is performed after the flat liquid crystal panel producing process and when the array substrate 10A and the CF substrate 10B are deformed such that the display surface 10DS becomes in a curved state from the flat state as illustrated in FIG. 6, the color filter 15 is displaced with respect to the pixel electrode 12. When the display surface 10DS is in a curved state, as illustrated in FIG. 7, the displaced color filter 15 overlaps the corresponding pixel electrode 12. Accordingly, in the curved liquid crystal panel 10 including the curved display surface 10DS, position displacement between the pixel electrode 12 and the corresponding color filter 15 is less likely to be caused and leaking of light is less likely to occur and high contrast properties are obtained. Furthermore, the position relation of the color filter 15, which is to be displaced according to the curving, with respect to the corresponding pixel electrode 12 in the flat-state display surface 10DS is determined based on the assumed displacement amount that is peculiar and is obtained corresponding to a position within a plane surface of the display surface 10DS. Therefore, compared to a known configuration, lowering of the aperture ratio caused by the structure for preventing leaking of light is less likely to be caused and brightness unevenness is less likely to be caused in an image displayed on the display surface 10DS.

Figure 8:
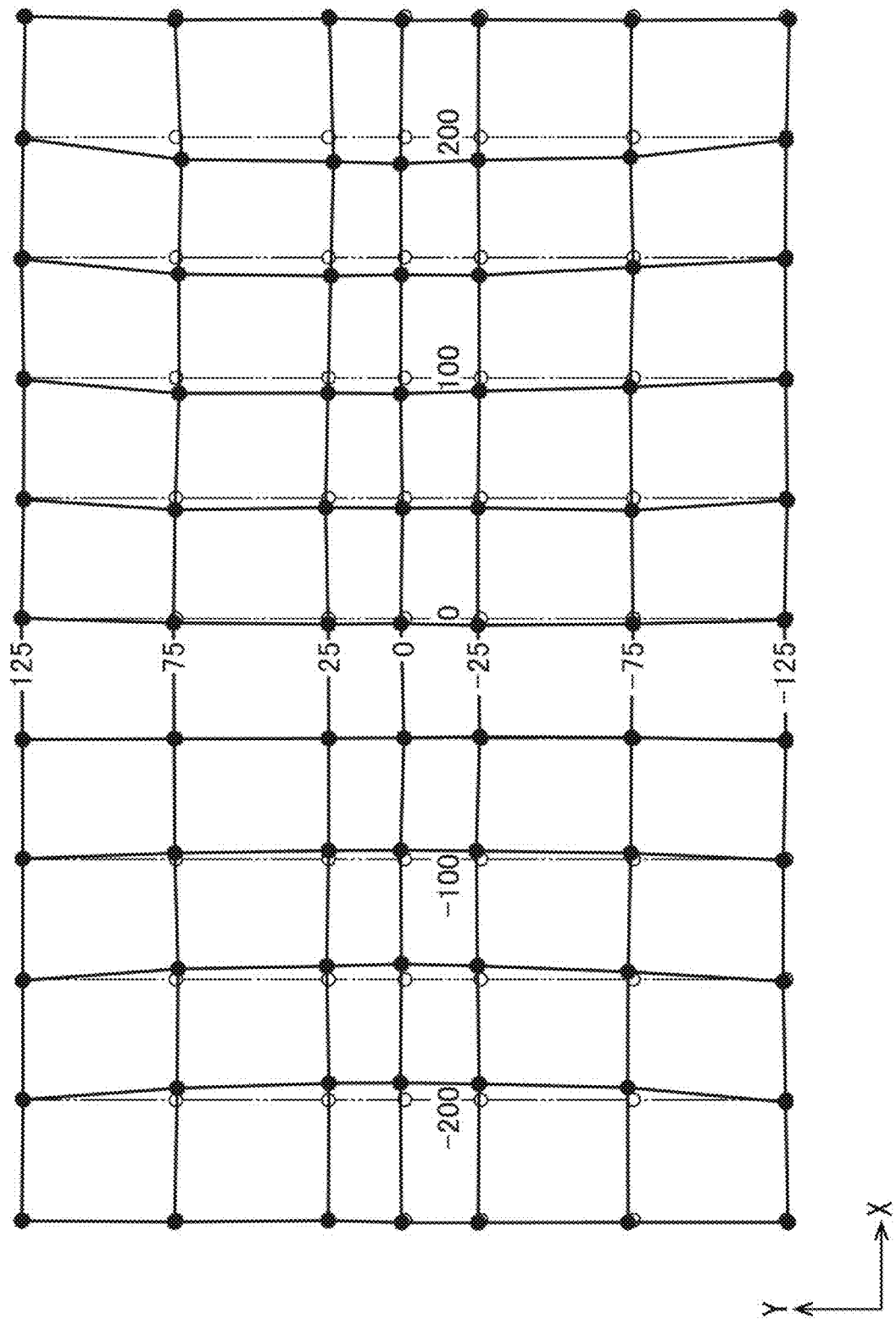
FIG. 8 is a view illustrating influences of curving on the color filter at each position within a surface area of a display surface.

Next, a specific method for determining the correction displacement amount of the color filter 15 that is present in each position within a plane surface area of the display surface 10DS will be described in detail. First, as illustrated in FIG. 8, positions of the color filters 15 that are present within a plane surface area of the display surface 10DS of the flat liquid crystal panel 20 and positions of the color filters 15 that are present within a plane surface area of the display surface 10DS of the curved liquid crystal panel 10 are obtained. FIG. 8 illustrates positions of the color filters 15 that are present within a plane surface area of the display surface 10DS of the flat liquid crystal panel 20 and also illustrates positions of the color filters 15 that are moved after the flat liquid crystal panel 20 is curved. In FIG. 8, a center position of the display surface 10DS is a reference position with respect to the X-axis direction and the Y-axis direction. In FIG. 8, each position of the color filters 15 of the flat liquid crystal panel 20 is indicated by a mark of "○" and each position of the color filters 15 of the curved liquid crystal panel 10 is indicated by a mark of "●". The positions of the color filters 15 of the flat liquid crystal panel 20 are connected by chain double-dashed lines and the positioned of the color filters 15 of the curved liquid crystal panel 10 are connected by solid lines. Numeric values in FIG. 8 represent distances from the reference position on each of reference lines that extend along the X-axis direction and the Y-axis direction while passing through the reference position. A unit of the numeric values is "mm" and symbols of "+" and "−" represent a direction from the reference position (an upper and lower direction or a left and right direction). In detail, regarding the numeric symbols in FIG. 8, "+" represents a position in an upper direction and a right direction from the reference position and "−" represents a position in a lower direction and a left direction from the reference position. The flat liquid crystal panel 20 illustrated in FIG. 8 has a long-side dimension of about 500 mm and a short-side dimension of about 250 mm. The curved liquid crystal panel 10 illustrated in FIG. 8 has radius of curvature of about 1000 mm. As is obvious from FIG. 8, the color filters 15 are displaced rightward (toward "+" side) according to the curving in a left portion of the display surface 10DS in the drawing, and the color filters 15 are displaced leftward (toward "−" side) according to the curving in the right portion in the drawing. The assumed displacement amount of the color filter 15 according to the curving is largest in a middle portion with respect to the Y-axis direction. The assumed displacement amount of the color filter 15 according to the curving is largest near the positions of ±200 mm with respect to the X-axis direction. The color filters 15 that are present in an outer peripheral edge portion of the display surface 10DS are less likely to be displaced according to the curving because the outer peripheral edge portions of the substrates 10A, 10B are fixed to each other with the sealing member 10D.

Figure 9:
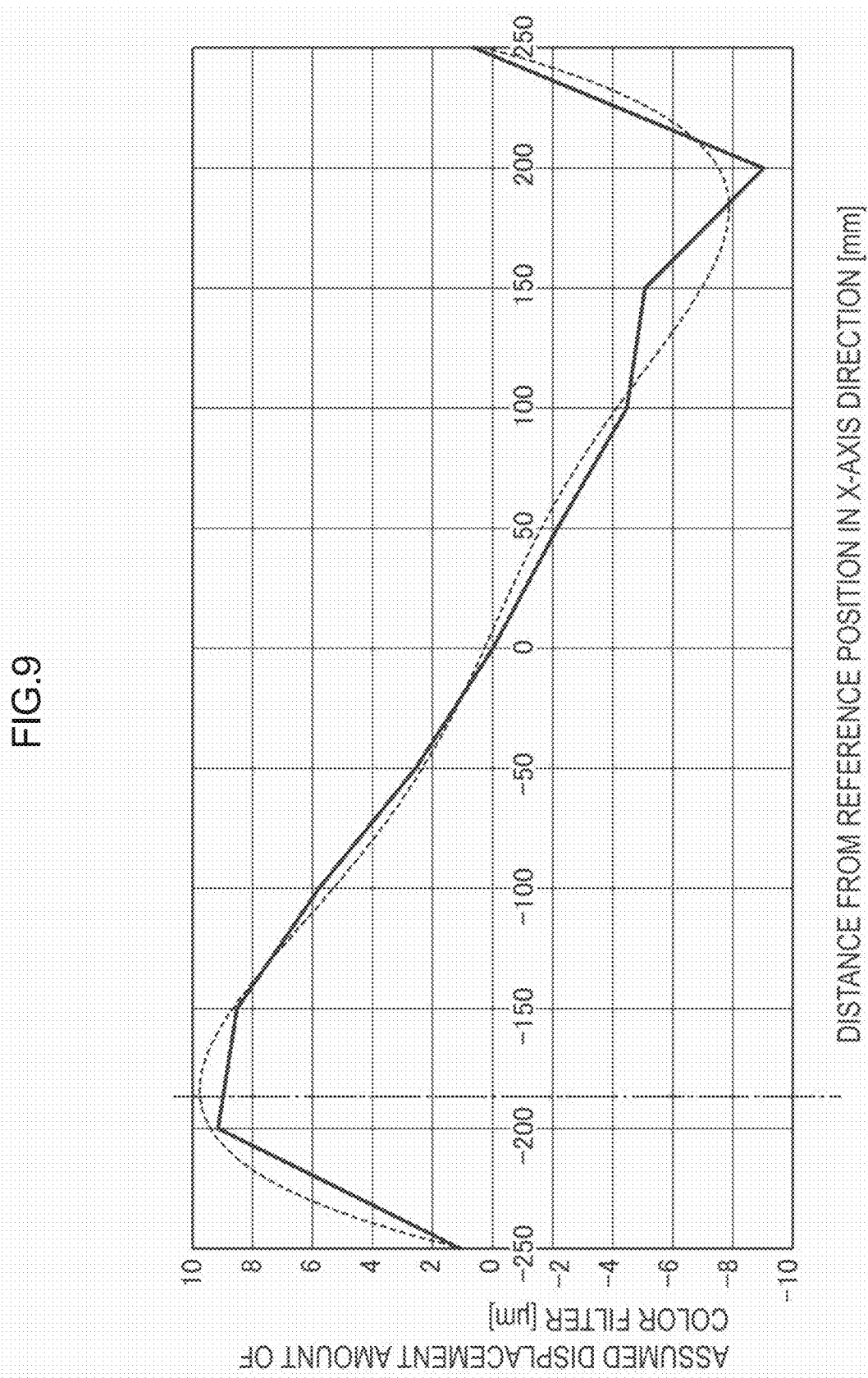
FIG. 9 is a graph obtained by plotting assumed displacement amounts of the color filter according to the curving of a display surface of the flat liquid crystal panel, the assumed displacement amounts being plotted for every position in the X-axis direction.
Figure 10:
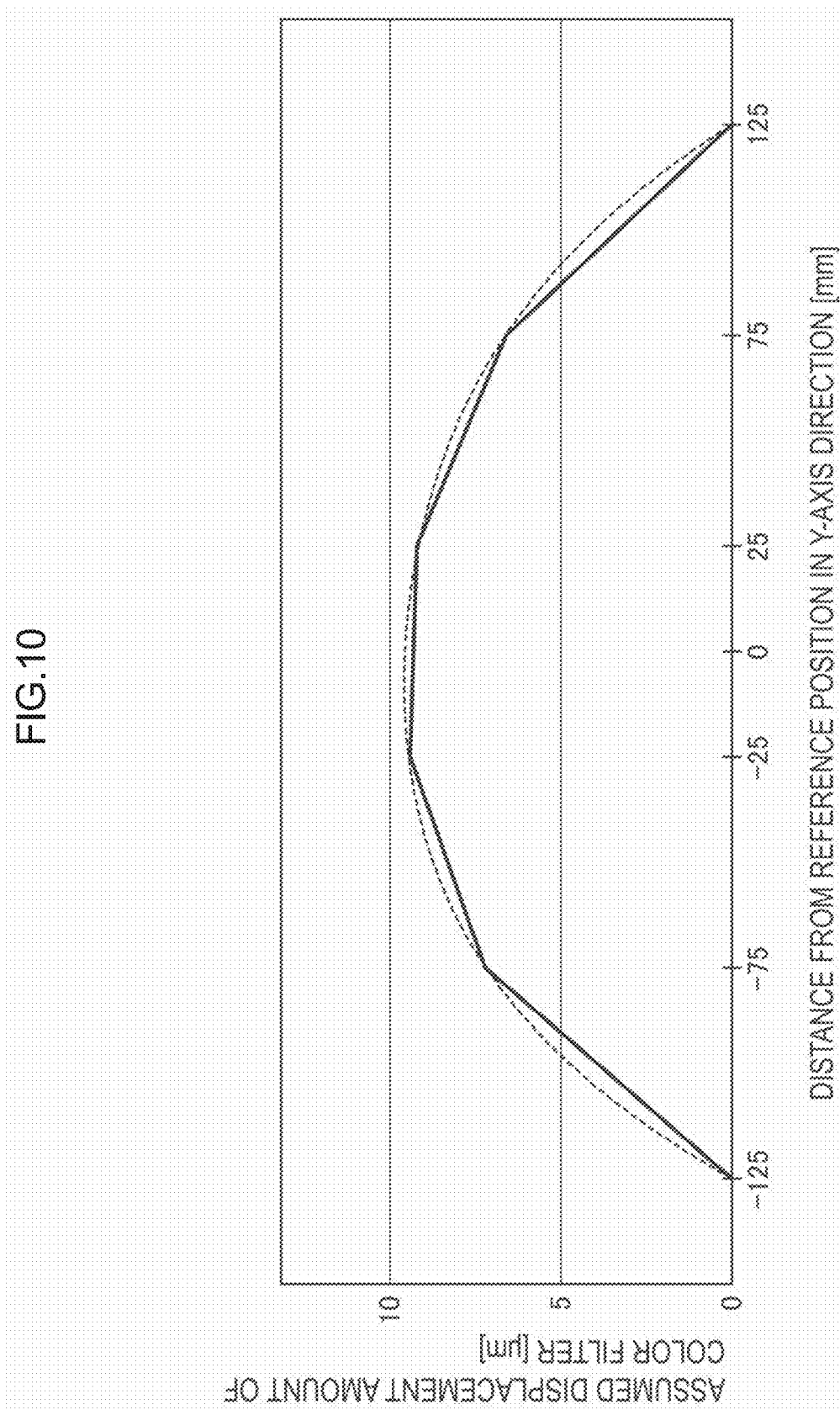
FIG. 10 is a graph obtained by plotting assumed displacement amounts of the color filter according to the curving of a display surface of the flat liquid crystal panel, the assumed displacement amounts being plotted for every position in the Y-axis direction.

FIGS. 9 and 10 illustrate graphs obtained by plotting the assumed displacement amounts of the color filters 15 at each position within an plane surface area of the display surface 10DS illustrated in FIG. 8. FIG. 9 is a graph (a solid line) obtained by plotting the assumed displacement amounts of the color filters 15 that are present on the reference line that passes through the reference position and extends along the X-axis direction within a surface plane area of the display surface 10DS. In FIG. 9, a lateral axis represents distances (a unit is "mm") from the reference position in the X-axis direction and a direction (symbols of "+" and "−") from the reference position (a position of 0 mm), and a vertical axis represents the assumed displacement amounts (a unit is "μm") of the color filters 15 in the X-axis direction and a direction (symbols of "+" and "−") from the reference position. As is obvious from FIG. 9, at two end positions with respect to the X-axis direction (positions of "±250 mm") and at a middle position (the position of 0 mm), the assumed displacement amount of the color filter 15 is substantially zero and the assumed displacement amount of the color filter 15 is about 9 μm, which is a largest value, near the position of "−190 mm" in the X-axis direction. Near the position of 190 mm in the X-axis direction, an absolute value of the assumed displacement amount of the color filter 15 is about 8 μm, which is a second largest value. The following matters are obvious from the above. A rate of change of the assumed displacement amount of the color filter 15 and a curvature according to the curving tend to be large at the two outer end portions of the curved liquid crystal panel 10 with respect to the X-axis direction. The rate of change of the assumed displacement amount of the color filter 15 and the curvature according to the curving tend to be small at a middle section with respect to the X-axis direction. A first approximate curve is obtained based on the plots illustrated with the graph in FIG. 9. The first approximate curve is indicated by a broken line in FIG. 9. In the present embodiment, a first function related to the first approximate curve is a quintic function, for example. The first approximate curve is obtained by plotting the assumed displacement amounts of the color filters 15 that are present in the middle section with respect to the Y-axis direction. FIG. 9 indicates the position where the assumed displacement amount of the color filters 15 is greatest on the "+" side on the first approximate curve with a chain line.

FIG. 10 is a graph (a solid line) obtained by plotting the assumed displacement amounts of the color filters 15 that are present on a straight line that passes through the position where the assumed displacement amount on the first approximate curve in FIG. 9 is about 9 μm, which is largest, with respect to the X-axis direction (the position indicated by the chain line in FIG. 9) and extends along the Y-axis direction. In FIG. 10, a lateral axis represents distances (a unit is "mm") from the reference position in the Y-axis direction and a direction (symbols of "+" and "−") from the reference position, and a vertical axis represents the assumed displacement amounts (a unit is "μm") of the color filters 15 in the X-axis direction and a direction (symbols of "+" and "−"). A second approximate curve is obtained based on the plots illustrated with the graph in FIG. 10. The second approximate curve is indicated by a broken line in FIG. 10. In the present embodiment, a second function related to the second approximate curve is a quartic function, for example. The second approximate curve is obtained by plotting along the Y-axis direction the assumed displacement amounts that are obtained at the position where the assumed displacement amount is largest on the first approximate curve with respect to the X-axis direction. As is obvious from FIG. 10, the assumed displacement amount of the color filter 15 is substantially zero at two end positions with respect to the Y-axis direction (positions of "±125 mm"), and the assumed displacement amount of the color filter 15 is about 9 µm, which is largest, at a middle position with respect to the Y-axis direction (the position of 0 mm). Accordingly, the first approximate curve is based on the plots at the position where the assumed displacement amount of the color filter 15 is largest with respect to the Y-axis direction within a plane surface area of the display surface 10DS.

The first function related to the first approximate curve that is obtained as described above is multiplied by the second function related to the second approximate curve, and a multiplied function is obtained. As described before, the second approximate curve is obtained by plotting along the Y-axis direction the assumed displacement amounts that are obtained at the position where the assumed displacement amount is largest on the first approximate curve with respect to the X-axis direction. Therefore, the multiplied function that is obtained by multiplying the second function related to the second approximate curve by the first function related to the first approximate curve represents regular assumed displacement amounts at every position within a plane surface area of the display surface 10DS. Namely, the multiplied function is defined with reference to the position where the assumed displacement amount on the first approximate curve is largest with respect to the X-axis direction. Therefore, with using the multiplied function, all of the assumed displacement amounts of the color filters 15 that are present on straight lines that pass other positions with respect to the X-axis direction (the positions where the assumed displacement amounts are not largest) can be obtained. Accordingly, the assumed displacement amounts of the color filters 15 according to the curving can be easily obtained for every position within a surface area of the display surface 10DS. Based on the assumed displacement amounts of the color filters 15 according to the curving that are obtained with using the multiplied function, the correction displacement amount of the color filter 15 with respect to the corresponding pixel electrode 12 in the flat liquid crystal panel 20 including the flat display surface 10DS can be easily determined for every position within a surface area of the display surface 10DS.

A method of determining a specific correction displacement amount of the color filter 15 with respect to the corresponding pixel electrode 12 in the flat liquid crystal panel 20 including the flat display surface 10DS will be described in detail. A method of determining the correction displacement amount of the color filter 15 that is present in the middle section with respect to the Y-axis direction and in a left section of the display surface 10DS in FIG. 8 will be particularly described. First, based on the graph related to the assumed displacement amounts of the color filters 15 illustrated in FIG. 9 and the multiplied function, the correction displacement amount of the color filter 15 is 0 µm at an outer edge position ("−250 mm" position) and a middle position ("0 mm" position) with respect to the X-axis direction, and the correction displacement amount of the color filter 15 is smallest, which is about −9 µm, at the "−190 mm" position with respect to the X-axis direction. Namely, the correction displacement amount of the color filter 15 corresponds to a value whose symbol of "+" or "−" is opposite from the value of the corresponding assumed displacement amount. A distance (60 mm) from the outer edge position with respect to the X-axis direction to the "−190 mm" position, where the correction displacement amount of the color filter 15 is smallest, is smaller than a distance (190 mm) from the middle position to the "−190 mm" position. Namely, a rate of change of the correction displacement amounts of the color filters 15 in a range from the outer edge position to the "−190 mm" position with respect to the X-axis direction is higher than a rate of change of the correction displacement amounts of the color filters 15 in a range from the middle position to the "−190 mm" position.

Figure 11:
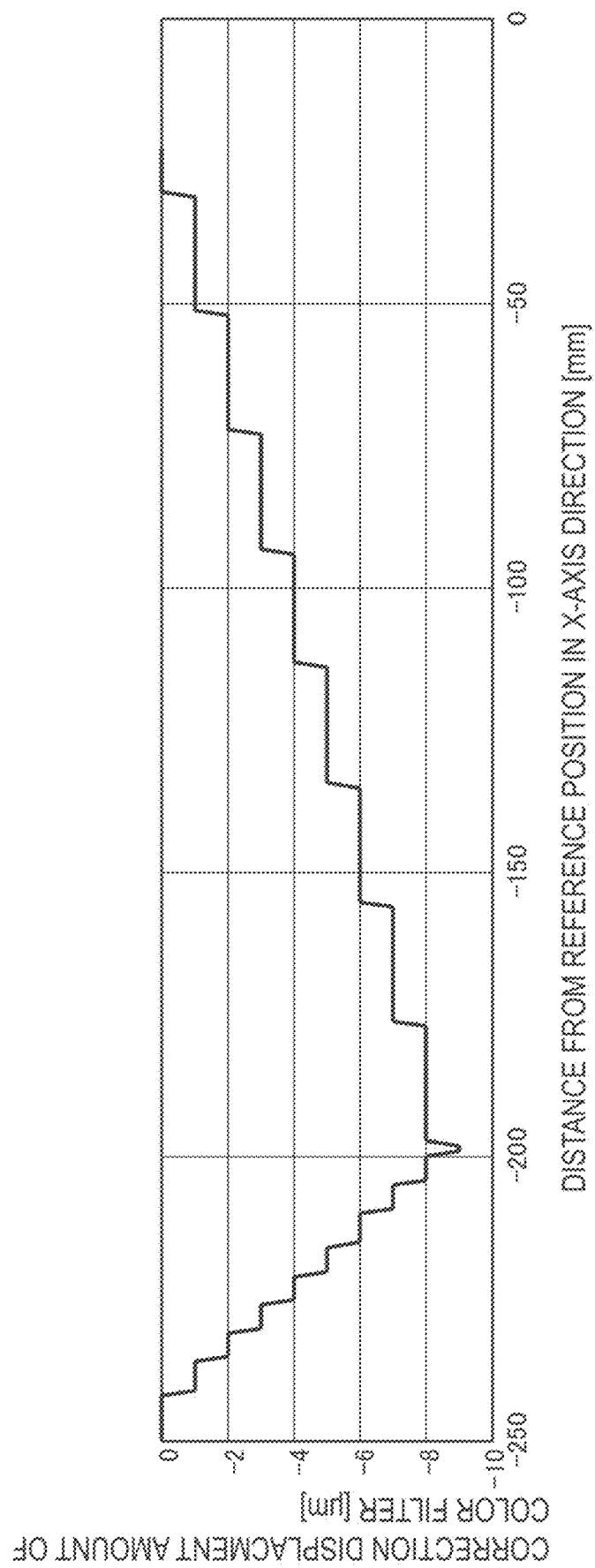
FIG. 11 is a graph representing a relation of correction displacement amounts of the color filter and a distance from a reference position in the X-axis direction.
Figure 12:
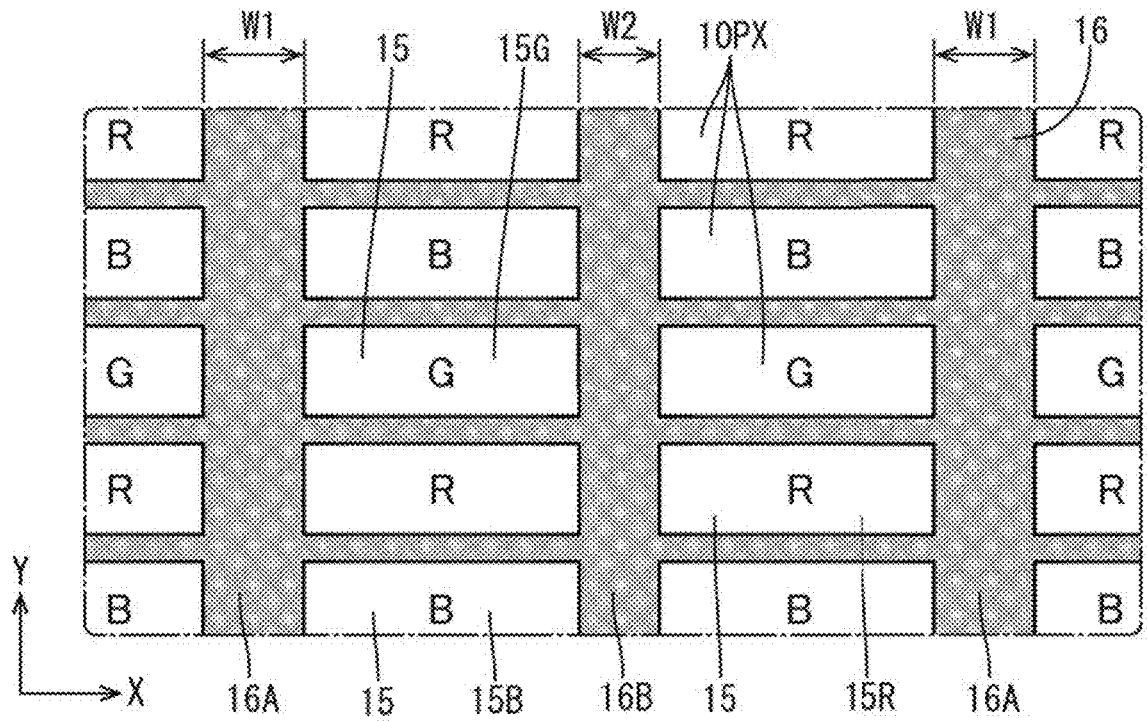
FIG. 12 is a plan view illustrating a reference dimension section and a first dimension section in a light blocking section of the CF substrate.

In the present embodiment, the light blocking section 16 included in the CF substrate 10B is designed to achieve such a distribution of the correction displacement amounts of the color filters 15. Namely, because the aperture ratio of the color filter 15 is defined by the light blocking section 16, the position of the color filter 15 with respect to the X-axis direction can be changed by adjusting a width dimension of the light blocking section 16 in the X-axis direction (refer FIG. 4). In the present embodiment, the width dimension of the light blocking section 16 in the X-axis direction is adjusted based on the assumed displacement amount (the multiplied function) of the color filter 15 according to a position in a surface area of the display surface 10DS so as to control the correction displacement amount of the color filter 15 with respect to the corresponding pixel electrode 12 of the flat liquid crystal panel 20. Specifically, the width dimension of the light blocking section 16 in the X-axis direction is varied regularly by every certain unit dimension with respect to the X-axis direction. Namely, as illustrated in FIG. 11, the correction displacement amount of the color filter 15 is an accumulated value obtained when the width dimension of the light blocking section 16 in the X-axis direction is regularly varied. FIG. 11 illustrate a graph in which a vertical axis represents the correction displacement amounts (a unit is "µm") of the color filter 15 and a lateral axis represents distances (a unit is "mm") from the reference position in the X-axis direction. The graph in FIG. 11 illustrates the correction displacement amounts of the color filters 15 in a left section in FIG. 8 and in a middle section with respect to the Y-axis direction of the display surface 10DS. Therefore, the vertical axis is provided with the symbol of "−" that represents a left direction with respect to the reference position. As is in FIG. 11, a distance from the outer edge position with respect to the X-axis direction ("−250 mm" position) to the "−190 mm" position, where the correction displacement amount of the color filter 15 is smallest, is 60 mm, and the correction displacement amount of the color filter 15 in the range of the distance is −9 µm. A distance from the middle position (0 mm) with respect to the X-axis direction to the "−190 mm" position, where the correction displacement amount of the color filter 15 is smallest, is 190 mm, and the correction displacement amount of the color filter 15 is −9 µm. Therefore, an interval at which the width dimension of the light blocking section 16 in the X-axis direction is varied (an interval at which the correction displacement amount is increased or decreased) is shorter in a former range than a latter range. Namely, the above-described interval is adjusted such that the interval becomes shorter as the rate of change in the correction displacement amount of the color filter 15 is higher, and the interval becomes longer as the rate of change in the correction displacement amount of the color filter 15 is lower. Accordingly, the width dimension of the light blocking section 16 is varied regularly by every certain unit dimension and the dimension is less likely to be changed abruptly. An aperture area of each of the color filters 15 is substantially constant regardless of the position thereof with respect to the X-axis direction.

Figure 13:
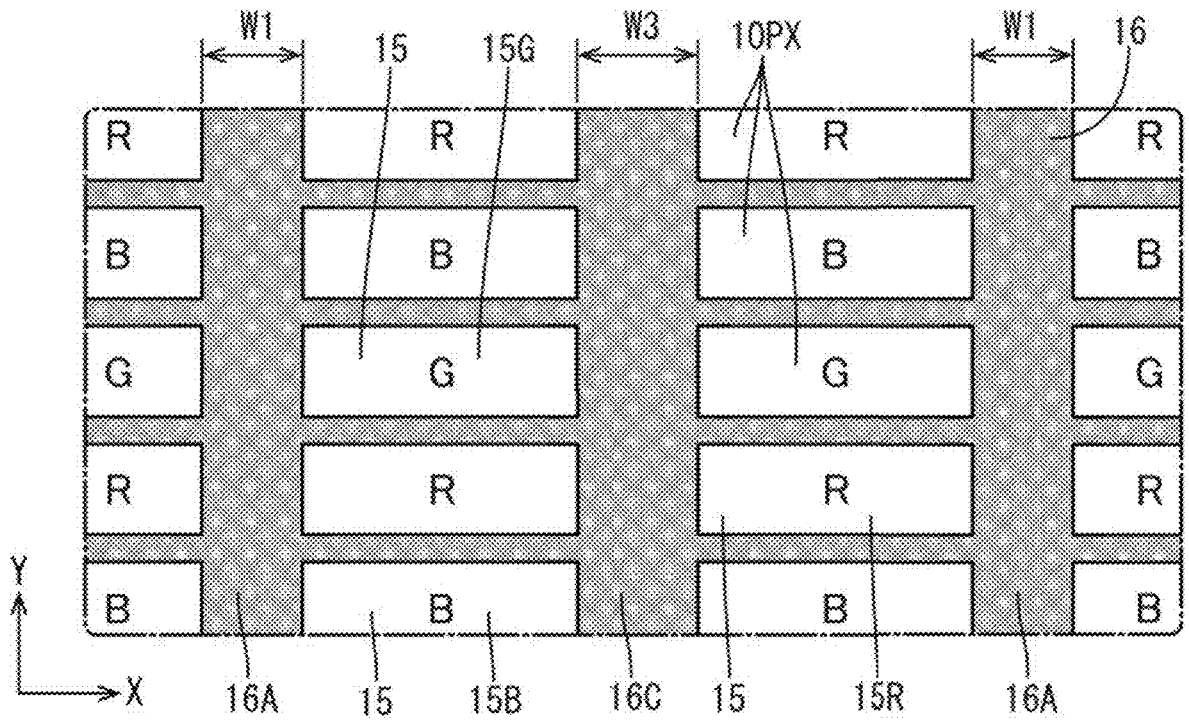
FIG. 13 is a plan view illustrating a reference dimension section and a second dimension section in a light blocking section of the CF substrate.

More in detail, as illustrated in FIG. 11, the width dimension of the light blocking section 16 in the X-axis direction is adjusted such that the accumulated value of the correction displacement amounts of the color filters 15 increases by every −1 μm in a range from the outer edge position with respect to the X-axis direction ("−250 mm" position) to the "−190 mm" position, where the correction displacement amount of the color filter 15 is smallest. The light blocking section 16 that is disposed in the range from the "−250 mm" position to the "−190 mm" position includes a reference dimension section 16A and a first dimension section 16B. The reference dimension section 16A has a reference dimension W1 that is a reference width dimension in the X-axis direction. The first dimension section 16B has a first dimension W2 that is a width dimension in the X-axis direction and is smaller than the reference dimension W1 by 1 μm (a unit dimension). The light blocking section 16 regularly includes the first dimension sections 16B. According to such a configuration, the color filters 15 are regularly displaced closer to the left side with respect to the X-axis direction in FIG. 12 or closer to the minus side in FIG. 8 while the position of the color filters 15 is closer to the "−190 mm" position from the "−250 mm" position. The width dimension of the light blocking section 16 in the X-axis direction is adjusted such that the accumulated value of the correction displacement amounts of the color filters 15 increases by every 1 μm in a range from the "−190 mm" position, where the correction displacement amount of the color filter 15 is smallest, to the outer edge position with respect to the X-axis direction ("0 mm" position). As illustrated in FIG. 13, the light blocking section 16 that is disposed in the range from the "−190 mm" position to the "0 mm" position includes the reference dimension section 16A and a second dimension section 16C. The width dimension of the reference dimension section 16A in the X-axis direction is the reference dimension W1. A width dimension of the second dimension section 16C in the X-axis direction is a second dimension W3 that is greater than the reference dimension W1 by 1 μm (a unit dimension). The light blocking section 16 regularly includes the second dimension sections 16C. According to such a configuration, the color filters 15 are displaced regularly closer to the right side with respect to the X-axis direction in FIG. 13 or closer to the plus side in FIG. 8 while the position of the color filters 15 is closer to the "0 mm" position from the "−190 mm" position. Thus, the color filters 15 that are disposed within a surface area of the display surface 10DS of the flat liquid crystal panel 20 are positioned away from the corresponding pixel electrodes 12 toward an opposite side from the displacement direction by the curving (refer FIG. 6). Therefore, if the color filters 15 are displaced in the X-axis direction through the flat liquid crystal panel deformation process, the color filters 15 are arranged so as to overlap the corresponding pixel electrodes 12, respectively, in a plan view (refer FIG. 7). Accordingly, leaking of light that is caused by the position displacement of the color filters 15 and the pixel electrodes 12 is less likely to occur.

As is described before, the curved liquid crystal panel (the curved display panel) 10 of the present embodiment includes the display surface 10DS displaying an image and curved at least around one curving axis CAX. The curved liquid crystal panel 10 includes the array substrate (the first substrate), the CF substrate (the second substrate) 10B that is disposed opposite the array substrate 10A while having a space therebetween, the pixel electrodes (first pixel section) 12, and the color filters (second pixel section) 15. The pixel electrodes 12 are included in the array substrate 10A and are arranged within a surface area of the display surface 10DS. The color filters 15 are included in the CF substrate 10B and arranged within the surface area of the display surface 10DS and overlap the corresponding pixel electrodes 12 when the display surface 10DS is in the curved state. Some of the color filters 15 are displaced with respect to the corresponding pixel electrodes 12 when the display surface 10DS becomes in the curved state from the flat state. Position relation of at least the color filters 15, which are to be displaced by the curving, and the corresponding pixel electrodes 12 is changed between in the flat state of the display surface 10DS and in the curved state of the display surface 10DS by the correction displacement amount that is obtained based on the assumed displacement amount according to the position within the surface area of the display surface 10DS.

According to such a configuration, in the array substrate 10A and the CF substrate 10B, the pixel electrodes 12 and the color filters 15 that are arranged within a surface area of the display surface 10DS are arranged to overlap with each other, respectively, and an image is displayed on the curved display surface 10DS with the pixel electrodes 12 and the color filters 15. In producing the curved liquid crystal panel 10, if the array substrate 10A and the CF substrate 10B are deformed such that the display surface 10DS becomes in the curved state from the flat state, some of the color filters 15 may be displaced from a position corresponding to the pixel electrode 12 and may be away from the corresponding pixel electrode 12 according to the curving because a space is between the array substrate 12A and the CF substrate 10B. This may cause leaking of light.

For some of the color filters 15 that are to be displaced from original positions by the curving, position relation with respect to the respective corresponding pixel electrodes 12 of the flat-state display surface 10DS is defined as described below. For each of the color filters 15 that are to be displaced by the curving, the assumed displacement amount with respect to the corresponding pixel electrode 12 that is assumed to be caused by deforming of the display surface 10DS from the flat state to the curved state is obtained for every position within a surface area of the display surface 10DS. The assumed displacement amount is a peculiar value corresponding to the position within a surface area of the display surface 10DS. For at least the color filters 15 that are to be displaced by the curving, the position relation with respect to the corresponding pixel electrodes 12 of the flat-state display surface 10DS is changed from the position relation in the curved-state display surface 10DS by the correction displacement amount based on the assumed displacement amount corresponding to the position within a surface area of the display surface 10DS. Therefore, the array substrate 10A and the CF substrate 10B are deformed such that the display surface 10DS becomes in the curved state from the flat state and the color filters 15 are displaced with respect to the pixel electrodes 12 according to the deformation. Then, the color filters 15 overlap the respective corresponding pixel electrodes 12 in the curved-state display surface 10DS. According to such a configuration, position displacement between the pixel electrodes 12 and the color filters 15 is less likely to be caused and the leaking of light is less likely to occur. Furthermore, for the color filters 15 that are to be displaced by the curving, the position relation with respect to the corresponding pixel electrodes 12 of the flat-state display surface 10DS is determined based on the assumed displacement amount that is peculiar to the position within a surface area of the display surface 10DS. Therefore, the aperture area of the pixel electrodes 12 and the color filters 15 at each position within a surface area of the display surface 10DS can be larger and unevenness is less likely to be caused in each size of the aperture areas compared to the prior art configuration including the black matrix having different widths in the two edge sections and in the middle section in the horizontal direction. Accordingly, lowering of the aperture ratio caused by the structure for preventing leaking of light is less likely to be caused and brightness unevenness is less likely to be caused in an image displayed on the display surface 10DS.

For at least the color filters 15 that are to be displaced by the curving, the position relation with respect to the pixel electrodes 12 in the flat-state display surface 10DS is changed from the position relation in the curved-state display surface 10DS by the correction displacement amount based on the approximate curve that is obtained by plotting the assumed displacement amounts at every position within a surface area of the display surface 10DS. According to such a configuration, the correction displacement amounts of the color filters 15, which are to be displaced by the curving, are determined based on the approximate curve obtained by plotting the assumed displacement amounts that are obtained at every position within a surface area of the display surface 10DS. The correction displacement amounts of the color filters 15, which are to be displaced by the curving, can be easily determined compared to the configuration in which the correction displacement amount of each color filter 15, which is to be displaced by the curving, is determined separately based on the assumed displacement amount that is obtained at every position within a surface area of the display surface 10DS.

The approximate curve includes the first approximate curve and the second approximate curve. The first approximate curve is obtained by plotting the assumed displacement amounts in the middle section of the display surface 10DS along the curving direction. The middle section is a middle of the display surface 10DS with respect to the curving perpendicular direction that is perpendicular to the curving direction. The second approximate curve is obtained by plotting the assumed displacement amounts in the position of the first approximate curve, where the assumed displacement amount is greatest, along the curving perpendicular direction. For at least the color filters 15 that are to be displaced by the curving, the position relation with respect to the corresponding pixel electrodes 12 in the flat-state display surface 10DS is different from the position relation thereof in the curved-state display surface 10DS by the correction displacement amount based on the multiplied function that is obtained by multiplying the first function related to the first approximate curve and the second function related to the second approximate curve. The second approximate curve is obtained by plotting the assumed displacement amounts at the position where the assumed displacement amount is largest on the first approximate curve along the curving perpendicular direction. Therefore, the multiplied function is obtained by multiplying the second function related to the second approximate curve by the first function related to the first approximate curve represents regular assumed displacement amounts at every position within a plane surface area of the display surface 10DS. Therefore, the correction displacement amount of the color filters 15, which are to be displaced by the curving, can be determined easily at every position within a surface area of the display surface 10DS based on the multiplied function.

The sealing member 10D is disposed between the outer peripheral edge portions of the array substrate 10A and the CF substrate 10B. According to such a configuration, the outer peripheral edge portions of the array substrate 10A and the CF substrate 10B are fixed with the sealing member 10D. Therefore, the substrates are less likely to be moved relatively each other even if the array substrate 10A and the CF substrate 10B are deformed such that the display surface 10DS becomes in the curved state from the flat state. Therefore, the assumed displacement amount of the color filter 15 with respect to the corresponding pixel electrode 12 caused by the deformation of the display surface 10DS from the flat state to the curved state is substantially zero at the outer peripheral edge position within a surface area of the display surface 10DS. Thus, the assumed displacement amounts at the positions other than the outer peripheral edge position can be determined with referring the outer peripheral edge position as the reference position. Accordingly, the correction displacement amounts of the color filters 15, which are to be displaced by the curving, can be determined easily.

The CF substrate 10B includes the light blocking section 16 that defines each of the adjacent color filters 15. For at least the color filters 15 that are to be displaced by the curving, the width of the light blocking section 16 in the curving direction is adjusted such that the position relation with respect to the pixel electrodes 12 in the flat-state display surface 10DS is changed from the position relation in the curved-state display surface 10DS by the correction displacement amount based on the assumed displacement amount corresponding to the position within a surface area of the display surface 10DS. According to such a configuration, each of the adjacent color filters 15 is defined by the light blocking section 16 such that light is less likely to travel between the adjacent color filters 15. The light blocking section 16 determines the aperture area of each of the color filters 15. The position of the color filter 15 in the curving direction can be changed by adjusting the width of the light blocking section 16 in the curving direction. Therefore, the position relation of the color filter 15 with respect to the pixel electrode 12 in the flat-state display surface 10DS is changed from the position relation in the curved-state display surface 10DS by adjusting the width of the light blocking section 16 in the curving direction by the correction displacement amount based on the assumed displacement amount of the color filter 15 corresponding to the position within a surface area of the display surface 10DS.

The width of the light blocking section 16 is adjusted so as to be varied regularly in the curving direction by every certain unit dimension. The aperture areas of the color filters 15 are varied regularly in the curving direction by every certain unit dimension. According to such a configuration, the width of the light blocking section 16 is less likely to be varied greatly depending on the positions within a surface area of the display surface 10DS.

The width of the light blocking section 16 is adjusted such that the interval at which the width of the light blocking section 16 is varied becomes shorter as the rate of change in the assumed displacement amount is higher, and the interval becomes longer as the rate of change in the assumed displacement amount is smaller. The rate of change of the assumed displacement amounts of the color filter 15 by the curving tends to be increased in the portion within a surface area of the curved-state display surface 10DS having a large curvature, and the rate of change of the assumed displacement amounts of the second pixel structure by the curving tends to be decreased in the portion having a small curvature. The interval in the curving direction at which the width of the light blocking section 16 and the aperture ratio of the color filters 15 are varied becomes shorter as the assumed displacement amount of the color filters 15 by the curving is greater, and the interval becomes longer as the assumed displacement amount is smaller. According to such a configuration, the width of the light blocking section 16 is less likely to be changed abruptly.

The second pixel sections include the color filters 15 that are adjacent to each other in the curving perpendicular direction, which is perpendicular to the curving direction of the display surface 10DS, and exhibit different colors and the color filters 15 that are adjacent to each other in the curving direction and exhibit a same color. Generally, an arrangement interval between the color filters 15 exhibiting the same color tends to be greater than an arrangement interval between the color filters 15 exhibiting different colors. The arrangement direction of the color filters 15 exhibiting the same color matches the curving direction. Therefore, the correction displacement amount of the color filter 15 can be easily adjusted to change the position of a least the color filters 15, which are to be displaced by the curving, in the curving direction with respect to the pixel electrodes 12 in the flat-state display surface 10DS.

The method of producing the curved liquid crystal panel 10 of the present embodiment includes the flat liquid crystal panel producing process (the flat display panel producing process) and the flat liquid crystal panel deformation process (the flat display panel deformation process). In the flat liquid crystal panel producing process, the flat liquid crystal panel (the flat display panel) 20 having a flat display surface 10DS is produced. The flat liquid crystal panel 20 includes the array substrate 10A and the CF substrate 10B that is opposite the array substrate 10A while having a space therebetween. The array substrate 10A includes the pixel electrodes 12 that are arranged within a surface area of the display surface 10DS displaying an image. The CF substrate 10B includes the color filters 15 that are arranged within a surface area of the display surface 10DS. In the flat liquid crystal panel deformation process, the flat liquid crystal panel 20 is deformed such that the display surface 10DS is curved around at least one curving axis CAX and the pixel electrodes 12 and the color filters 15 are overlapped with each other, respectively. In the flat liquid crystal panel producing process, for the color filters 15 that are to be displaced with respect to the corresponding pixel electrodes 12 according to the performance of at least the flat liquid crystal panel deformation process, the position relation with respect to the pixel electrodes 12 in the flat-state display surface 10DS is changed from the position relation in the curved-state display surface 10DS by the correction displacement amount based on the assumed displacement amount corresponding to the position within a surface area of the display surface 10DS.

In the flat liquid crystal panel producing process, the array substrate 10A and the CF substrate 10B are arranged opposite each other while having a space therebetween and the flat liquid crystal panel 20 having the flat display surface 10DS is produced. In the flat liquid crystal panel deformation process, the flat liquid crystal panel 20 is deformed such that the display surface 10DS is curved at least around one curving axis CAX. As the display surface 10DS becomes in the curved state from the flat state, some of the color filters 15 may be displaced and away from the corresponding pixel electrodes 12. Therefore, if the color filters 15 to be displaced and away from the corresponding pixel electrodes 12, leaking of light may be caused.

In the flat liquid crystal panel deformation process, for the color filters 15 that are to be displaced away from the first pixel section according to the subsequent performance of the flat liquid crystal panel deformation process, the position relation with respect to the pixel electrodes 12 is determined as described below. Namely, for the color filters 15 that are to be displaced by the curving, the assumed displacement amounts with respect to the corresponding pixel electrodes 12 according to deformation of the display surface 10DS from the flat state to the curve state are obtained for every position within a surface area of the display surface 10DS. Each of the obtained assumed displacement amounts is a peculiar value corresponding to a position within a surface area of the display surface 10DS. For at least the color filters 15 that are to be displaced according to the curving, the position relation with respect to the pixel electrodes 12 in the flat-state display surface 10DS is changed from the position relation in the curved-state display surface 10DS by the correction displacement amount based on the assumed displacement amount corresponding to the position within a surface area of the display surface 10DS. Therefore, the array substrate 10A and the CF substrate 10B are deformed such that the display surface 10DS becomes in the curved state from the flat state in the flat liquid crystal display panel deformation process and the color filter 15 is displaced with respect to the corresponding pixel electrode 12. Then, the color filter 15 overlaps the corresponding pixel electrode 12 in the curved-state display surface 10DS. Thus, the position displacement is less likely to be caused between the pixel electrodes 12 and the color filters 15 and leaking of light is less likely to occur. Furthermore, for the color filters 15 that are to be displaced according to the curving, the position relation with respect to the corresponding pixel electrodes 12 in the flat-state display surface 10DS is determined based on the peculiar assumed displacement amount corresponding to the position within a surface area of the display surface 10DS. Therefore, compared to the prior art configuration in which the black matrix has different widths in the two edge sections and in the middle section in the horizontal direction, large aperture areas of the pixel electrodes 12 and the color filters 15 are obtained at every position within a surface area of the display surface 10DS and unevenness is less likely to be caused in the aperture areas. According to such a configuration, lowering of the aperture ratio caused by the structure for preventing leaking of light is less likely to be caused and brightness unevenness is less likely to be caused in an image displayed on the display surface 10DS.

Other Embodiments

The present technology is not limited to the embodiments described in the above and the drawings but the embodiments described below may be included in the technical scope.

(1) FIG. 8 referred in the above embodiment illustrates the distribution of positions of the color filters under a specific condition. Influences of the curving on the color filters may be changed at each position thereof according to conditions such as a plate thickness of each substrate included in the curved liquid crystal panel, a screen size of the curved liquid crystal panel, or radius of curvature of the curved liquid crystal panel. Therefore, a distribution of positions of the color filters may be different from that of FIG. 8.

(2) In FIGS. 9 and 10 referred in the above embodiment, the approximate curve (the first approximate curve or the second approximate curve) is based on a quantic function or a quartic function. However, the approximate function may be an n-th function other than the quartic function or the quantic function, an exponential function, or a logarithmic function.

(3) In the above embodiment, the unit dimension used for adjusting the dimension of the light blocking section in the X-axis direction is 1 µm; however, the unit dimension may be altered other than 1 µm as appropriate. The unit dimension used for adjusting the dimension of the light blocking section in the X-axis direction may include two or more kinds of unit dimensions. In such a configuration, the width of the light blocking section in the X-axis direction may be varied regularly at multiple kinds of intervals. The width of the light blocking section in the X-axis direction may be varied irregularly.

(4) In the curved liquid crystal panel of the above embodiment, the middle section with respect to the long-side direction thereof projects toward the front side and the two edge sections thereof with respect to the long-side direction are recessed toward the back side. However, the curved liquid crystal panel may be curved such that the two edge sections thereof with respect to the long-side direction are projected toward the front side and the middle section with respect to the long-side direction is recessed toward the back side.

(5) In the above embodiment, the curving axis of the curved liquid crystal panel matches the short-side direction (the direction in which the color filters exhibiting different colors are arranged) and the curving direction matches the long-side direction (the direction in which the color filters exhibiting a same color are arranged). However, the curving direction of the curved liquid crystal panel may match the short-side direction (the direction in which the color filters exhibiting different colors are arranged) and the curving axis may match the long-side direction (the direction in which the color filters exhibiting a same color are arranged). In such a configuration, the dimension of the light blocking section in the Y-axis direction is adjusted and a unit dimension used for the adjustment becomes smaller than that in the above embodiment.

(6) In the above embodiment, the curved liquid crystal panel has the rectangular plan view shape; however, the curved liquid crystal panel may have a plan view shape of a square, a circle, or an oval.

(7) In the above embodiment, the TFT is used as the switching component of the curved liquid crystal panel. However, the liquid crystal panel may include switching components other than the TFTs (for example, thin film diode (TFD)). Further, the present technology may be applied to a black-and-white display curved liquid crystal panel other than the color-display curved liquid crystal panel.

(8) In the above embodiment, the curved liquid crystal panel includes the liquid crystal layer sandwiched between the pair of substrates; however, a curved display panel may include functional organic molecules other than the liquid crystal material sandwiched between the pair of substrates.

(9) In the above embodiment, the curved liquid crystal panel is described. However, other kinds of curved display panels (such as a curved organic EL display panel, a curved electrophoretic display panel (EPD), and a curved micro electro mechanical system (MEMS) display panel may be included in the technical scope.

The invention claimed is:

1. A curved display pane including a display surface displaying an image, the display surface being curved around at least one curving axis, the curved display panel comprising:

a first substrate;

a second substrate disposed opposite the first substrate while having a space therebetween;

first pixel sections included in the first substrate and arranged within a surface area of the display surface; and second pixel sections included in the second substrate and arranged within the surface area of the display surface and overlapping the first pixel sections, respectively, in a curved state of the display surface, wherein at least some of the second pixel sections are to be displaced with respect to the first pixel sections according to change of the display surface from a flat state to the curved state, and for the at least some of the second pixel sections that are to be displaced by curving, position relation with respect to the first pixel sections corresponding to the at least some of the second pixel sections in the flat state of the display surface is changed from that in the curved state of the display surface by correction displacement amounts based on assumed displacement amounts corresponding to positions of the first pixel sections and the at least some of the second pixel sections corresponding to each other within the surface area of the display surface, the correction displacement amounts include a first correction displacement amount a second correction displacement amount, a third correction displacement amount, and a fourth correction displacement amount and the assumed displacement amounts include a first assumed displacement amount a second assumed displacement amount a third assumed displacement amount and a fourth assumed displacement amount, the first correction displacement amount in a curving direction that is perpendicular to the curving axis based on the first assumed displacement amount between first one of the first pixel sections and first one of the at least some of the second pixel sections that are corresponding to each other in a first position within the surface area of the display surface differs from the second correction displacement amount in the curving direction based on the second assumed displacement amount between second one of the first pixel sections and second one of the at least some of the second pixel sections that are corresponding to each other in a second position within the surface area, and the first position and the second position are disposed adjacent to each other in the curving direction, and the third correction displacement amount in a curving perpendicular direction parallel to the curing axis based on the third assumed displacement amount between third one of the first pixel sections and third one of the at least some of the second pixel sections that are corresponding to each other in a third position within the surface area of the display surface differs from the fourth correction displacement amount in the curving perpendicular direction based on the fourth assumed displacement amount between fourth one of the first pixel sections and fourth one of the at least some of the second pixel sections that are corresponding to each other in a fourth position within the surface area, and the third position and the fourth position are disposed adjacent to each other in the curving perpendicular direction.

2. The curved display panel according to claim 1, wherein the correction displacement amounts are based on an approximate curve that is obtained by plotting the assumed displacement amounts at the every positions within the surface area of the display surface.

3. The curved display panel according to claim 2, wherein
the approximate curve includes a first approximate curve and a second approximate curve, the first approximate curve is obtained by plotting the assumed displacement amounts in a middle section of the display surface with respect to the curving perpendicular direction and the middle section extending in the curving direction, and the second approximate curve is obtained by plotting the assumed displacement amounts in a section that includes a position having a largest assumed displacement amount on the first approximate curve and extends in the curving perpendicular direction, and
the correction displacement amounts of the at least some of the second pixel sections that are to be displaced with respect to the first pixel sections are based on a multiplied function that is obtained by multiplying a first function related to the first approximate curve and a second function related to the second approximate curve.

4. The curved display panel according to claim 1, further comprising a sealing member disposed between outer peripheral edge portions of the first substrate and the second substrate to fix the outer peripheral edge portions to each other.

5. The curved display panel according to claim 1, further comprising a light blocking sections included in the second substrate and defining each of the second pixel sections that are adjacent to each other, wherein
for the at least the some of the second pixel sections that are to be displaced by curving, the position relation with respect to the first pixel sections in the flat state of the display surface is changed from that in the curved state of the display surface by adjusting a widths of the light blocking sections in the curving direction by the correction displacement amounts based on the assumed displacement amounts corresponding to the positions within the surface area of the display surface.

6. The curved display panel according to claim 5, wherein the widths of the light blocking sections are adjusted and varied regularly in the curving direction by every certain unit dimension.

7. The curved display panel according to claim 6, wherein the widths of the light blocking sections in the curving direction are adjusted such that the light blocking sections having different widths are disposed at a shorter interval as a rate of change in one correction displacement amount based on one assumed displacement amount within a predefined length of the display surface in the curving direction is higher, and the light blocking sections having different widths are disposed at a longer interval as a rate of change in another correction displacement amount based on another assumed displacement amount within the predefined length of the display surface in the curving direction is smaller.

8. The curved display panel according to claim 1, wherein the second pixel sections include color filters that are adjacent to each other in the curving perpendicular direction perpendicular to the curving direction of the display surface exhibit different colors and color filters that are adjacent to each other in the curving direction exhibit a same color.

9. A method of producing a curved display panel, the method comprising:
a flat display panel producing process of producing a flat display panel having a display surface that is in a flat state, the flat display panel producing process including
disposing a first substrate above a second substrate to be opposite the first substrate and have a space between the first substrate and the second substrate,
disposing first pixel sections on the first substrate to be arranged within a surface area of the display surface displaying an image,
disposing second pixel sections on the second substrate to be arranged within the surface area of the display surface; and
a flat display panel deformation process of deforming the flat display panel and curving the display surface around at least one curving axis to overlap the first pixel sections and the second pixel sections,
in the flat display panel producing process, for at least some of the second pixel sections that are to be displaced with respect to the first pixel sections according to performance of the flat display panel deformation process, position relation with respect to the first pixel sections corresponding to the at least some of the second pixel sections in the display surface in the flat state is changed from position relation in the display surface in a curved state by correction displacement amounts based on assumed displacement amounts corresponding to positions of the first pixel sections and the at least some of the second pixel sections corresponding to each other within the surface area of the display surface,
the correction displacement amounts include a first correction displacement amount a second correction displacement amount, a third correction displacement amounts include a first assumed displacement amount a second assumed displacement amount a third assumed displacement amount and a fourth assumed displacement amount,
the first correction displacement amount in a curving direction that is perpendicular to the curving axis based on the first assumed displacement amount between first one of the first pixel sections and first one of the at least some of the surface area of the display surface differs from the second correction displacement amount in the curving direction based on the second assumed displacement amount between second one of the first pixel sections and second one of the at least some of within the surface area, and the first position and the second position are disposed adjacent to each other in the curving direction, and
the third correction displacement amount in a curving perpendicular direction parallel to the curing axis based on the third assumed displacement amount between third one of the first pixel sections and third one of the at least some of the second pixel sections that are corresponding to each other in a third position within the surface area of the display surface differs from the fourth correction displacement amount in the curving perpendicular direction based on the fourth assumed displacement amount between fourth one of the first pixel sections and fourth one of the at least some of the second pixel sections that are corresponding to each other in a fourth position within the surface area, and the third position and the fourth position are disposed adjacent to each other in the curving perpendicular direction.

10. The method according to claim 9, wherein:

in the flat display panel producing process, the correction displacement amounts by which the at least some of the second pixel sections to be displaced by curving with respect to the first pixel sections are determined based on a first approximate curve that is obtained by plotting the assumed displacement amounts in a middle section of the display surface with respect to the curving perpendicular direction and the middle section extending in the curving direction and a second approximate curve that is obtained by plotting the assumed displacement amounts in a section that includes a position having a largest assumed displacement amount on the first approximate curve and extends in the curving perpendicular direction, and in the flat display panel producing process, the correction displacement amounts of the at least some of the second pixel sections that are to be displaced with respect to the first pixel sections is based on a multiplied function that is obtained by multiplying a first function related to the first approximate curve and a second function related to the second approximate curve.

11. The curved display panel according to claim 1, wherein the first substrate is an array substrate and the second substrate is a CF substrate and the array substrate and the CF substrate are curved such that a surface of the CF substrate facing away from the space protrudes.

12. The curved display, panel according to claim 11, wherein in the flat state, the at least some of the second pixel sections are disposed farther away from a center of the display surface with respect to the curving direction than the first pixel sections are.

* * * * *